US010041552B2

(12) United States Patent
Ulrey et al.

(10) Patent No.: US 10,041,552 B2
(45) Date of Patent: Aug. 7, 2018

(54) METHODS AND SYSTEMS FOR CONTROLLING A VEHICLE AIR CONDITIONER USING A PRESSURE SENSOR LOCATED WITHIN A COMPRESSOR

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 14/801,523

(22) Filed: Jul. 16, 2015

(65) Prior Publication Data
US 2017/0015176 A1 Jan. 19, 2017

(51) Int. Cl.
*B60H 1/32* (2006.01)
*F16D 48/00* (2006.01)

(52) U.S. Cl.
CPC ............ *F16D 48/00* (2013.01); *B60H 1/321* (2013.01); *B60H 1/3222* (2013.01); *B60H 2001/325* (2013.01); *B60H 2001/3272* (2013.01); *B60H 2001/3277* (2013.01)

(58) Field of Classification Search
CPC ............ B60H 1/3205; B60H 2001/327; B60H 2001/3248; B60H 2001/325; B60H 2001/3251; B60H 2001/3252; F04B 49/00; F04B 49/08
See application file for complete search history.

(56) References Cited

U.S. PATENT DOCUMENTS

| | | | | | |
|---|---|---|---|---|---|
| 3,216,490 | A | * | 11/1965 | Whistler, Jr. | B60H 1/00007 165/202 |
| 4,495,778 | A | * | 1/1985 | Shaw | G05D 23/1912 62/209 |
| 4,510,763 | A | * | 4/1985 | Johnson | H01H 35/2657 200/83 P |
| 4,621,503 | A | * | 11/1986 | Woods | G01L 9/16 336/20 |
| 5,634,345 | A | * | 6/1997 | Alsenz | F04B 39/0207 184/7.4 |
| 6,237,681 | B1 | * | 5/2001 | Takano | B60H 1/00314 165/241 |
| 6,357,242 | B1 | | 3/2002 | Farley et al. | |

(Continued)

OTHER PUBLICATIONS

Pursifull, R. "Systems and Methods for Compressor Clutch Control," U.S. Appl. No. 14/801,256, filed Jul. 16, 2015, 49 pages.

*Primary Examiner* — Jonathan Bradford
(74) *Attorney, Agent, or Firm* — Julia Voutyras; McCoy Russell LLP

(57) ABSTRACT

Methods and systems are provided for adjusting operation of an automotive air conditioning system including a pressure sensor positioned within a compression chamber. In one example, a method may include adjusting operation of the air conditioning system based on one or more parameters of a compressor operation including a compressor inlet pressure, a compressor outlet pressure, and a compressor speed, that are determined based on output from the pressure sensor positioned within the compression chamber.

15 Claims, 7 Drawing Sheets

(56) References Cited

U.S. PATENT DOCUMENTS

| | | | |
|---|---|---|---|
| 6,381,545 B1* | 4/2002 | Goubeaux | B60H 1/3225 62/126 |
| 6,672,085 B1* | 1/2004 | Sangwan | B60H 1/008 62/126 |
| 7,150,158 B2 | 12/2006 | Morita et al. | |
| 8,332,098 B2 | 12/2012 | Major et al. | |
| 2006/0005552 A1* | 1/2006 | Anyoji | B60H 1/00764 62/133 |
| 2013/0074529 A1 | 3/2013 | Rollinger et al. | |
| 2013/0239599 A1 | 9/2013 | Pursifull et al. | |
| 2013/0294937 A1* | 11/2013 | Worden | F04B 25/00 417/53 |

* cited by examiner

METHODS AND SYSTEMS FOR CONTROLLING A VEHICLE AIR CONDITIONER USING A PRESSURE SENSOR LOCATED WITHIN A COMPRESSOR

FIELD

The present description relates generally to methods and systems for controlling a vehicle air conditioning system including a compressor.

BACKGROUND/SUMMARY

Automotive air conditioning systems provide driver comfort during driving by cooling air in the vehicle cabin based on a desired cabin temperature. Cabin air is cooled by passing air over an evaporator and directing cooled air to the cabin. Air around the evaporator is cooled when a liquid refrigerant changes into a gaseous form in the evaporator thereby absorbing heat from the surrounding air. The refrigerant vapors from the evaporator then enter a compressor, where it is compressed to a high pressure refrigerant vapor. The pressurized refrigerant vapors from the compressor then enter a condenser, where it is converted into a liquid. The high pressure liquid refrigerant from the condenser is then passed through an expansion valve, where it is allowed to expand to form low-pressure liquid refrigerant, which subsequently enters the evaporator.

In order to maintain normal operation of the air conditioning system, one or more parameters (such as pressure, temperature, etc.) of the refrigerant circulated through the various components of the air conditioning system are monitored based on outputs from one or more sensors. For example, a low side pressure (also herein referred to as compressor inlet pressure) of the refrigerant vapor exiting the evaporator and entering the compressor is monitored by a low side pressure sensor located in the low pressure line delivering refrigerant vapors to the compressor. When the low side pressure decreases below a threshold, it provides an indication that the evaporator is nearing freezing conditions. Therefore, the compressor is turned off to prevent the evaporator from freezing water. In addition, a high side pressure sensor located in the high pressure line delivering pressurized refrigerant vapors from the compressor to the condenser is utilized to monitor a pressure of the high pressure refrigerant vapor (also herein referred to as compressor outlet pressure) exiting the evaporator. When the high side pressure sensor indicates excessive pressure conditions above a threshold outlet pressure, the compressor may be turned off. Further, in some examples, a compressor speed sensor is employed to determine a compressor speed, which may be utilized for diagnosing compressor operation. As such, the compressor may be driven by an energy conversion device, such as an engine or a motor, via a clutch mechanism. Therefore, as an alternative to employing a compressor speed sensor, the compressor speed may be inferred from a speed of the energy conversion device.

However, the inventors herein have recognized potential issues with such systems. As one example, employing two pressure sensors, one in the low pressure line to the compressor and another in the high pressure line from the compressor, increases the cost of the system. Further, employing a compressor speed sensor for compressor speed measurements adds to the system cost, and inferring compressor speed (for example, from engine speed) does not provide accurate results if the clutch fails to engage as commanded and leads to reduced diagnostic efficiency. Still further, as more sensors are used, more interfaces and control strategies are required, which increases system complexity including packaging complexities. Overall, by utilizing three sensors to monitor status of refrigerant circulating through a single compressor, production cost and packaging space are increased, which results in bulky and expensive air conditioning systems.

In one example, the issues described above may be addressed by a method for a vehicle air conditioning system, comprising: disengaging a compressor clutch in response to a compressor inlet pressure below a first threshold pressure; and increasing a condenser fan speed in response to a compressor outlet pressure above a second threshold pressure, both the compressor inlet pressure and outlet pressure based on a pressure sensor located within a compression chamber of the compressor.

In this way, in contrast to utilizing two pressure sensors each located within a high side line and a low side line, a single pressure sensor located within a compression chamber of a compressor is utilized to determine a compressor low side pressure and a compressor high side pressure.

Locating a single pressure sensor within one of the air conditioning compressor's compression chambers may result in a single sensor that has more information on it than conventionally arranged sensors. For example, the compression chamber sees both the low side pressure and the high side pressure at some point in the compression cycle. Therefore, the minimum compression chamber pressure during the compression cycle is indicative of the low side pressure, and the maximum compression chamber pressure during the compression cycle is indicative of the high side pressure. Further, the rate at which the compression chamber pressure varies between maximum and minimum pressure is directly proportional to actual compressor speed. Therefore, the pressure variation is indicative of the actual compressor speed, whether or not the AC compressor clutch is successfully following the command.

As one example, during vehicle operation when the air conditioning system is turned on, an output from a pressure sensor located within a compression chamber of an air conditioning compressor cylinder may be utilized to determine a compressor inlet pressure and a compressor outlet pressure of the compressor. Further, the output from the pressure sensor may also be utilized to determine an operating speed of the compressor. For example, when a compressor piston is on an intake stroke and a suction valve of the cylinder including the piston is open, refrigerant vapors flow into the compression chamber from a suction line (that is, low pressure line) and a pressure of the refrigerant in the cylinder is at the pressure of the refrigerant in the suction line. Therefore, in one example, during a first window of the intake stroke when the suction valve is opened, pressure indications from the pressure sensor may be utilized to determine the compressor inlet pressure. Further, when the compressor piston is on a discharge stroke and a discharge valve of the cylinder is open, refrigerant vapors flow out of the cylinder and a pressure of the refrigerant in the cylinder is at a pressure of the refrigerant in the discharge line (that is, high pressure line). Therefore, during a second window of the discharge stroke when the discharge valve is opened, pressure indications from the pressure sensor may be utilized to determine the compressor outlet pressure. Still further, a duration to complete one cylinder cycle (the duration is also referred to as a rotation period herein) may be determined from the pressure sensor output; and a compressor speed may be determined from the rotation period. Thus, the compressor inlet pressure, the compressor outlet pressure, and the compressor speed may be determined based on output from the pressure sensor located within a compression chamber of the air conditioning compressor.

In another example, the compressor inlet pressure may be determined based on the minimum pressure indicated by the pressure sensor within the compression chamber during the compressor cylinder cycle, and the outlet pressure may be determined based on the maximum pressure indicated by the pressure sensor during the compressor cylinder cycle.

Further, the compressor inlet pressure, the compressor outlet pressure, and the compressor speed may be utilized to monitor operation and/or diagnose abnormal conditions of one or more components of the air conditioning system. As an example, the compressor inlet pressure may be utilized to diagnose an evaporator freezing condition; the compressor outlet pressure may be utilized to diagnose excess outlet pressure conditions, such as those that may arise from engine speed transients; and the compressor speed may be utilized to monitor and/or diagnose a clutch condition, such as whether the clutch is engaged, open or slipping.

In this way, by utilizing a single pressure sensor located within a compression chamber of an air conditioning compressor to determine a compressor inlet pressure, a compressor outlet pressure, and a compressor speed, production cost may be reduced and more compact packaging may be achieved along with improved monitoring and diagnostics.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
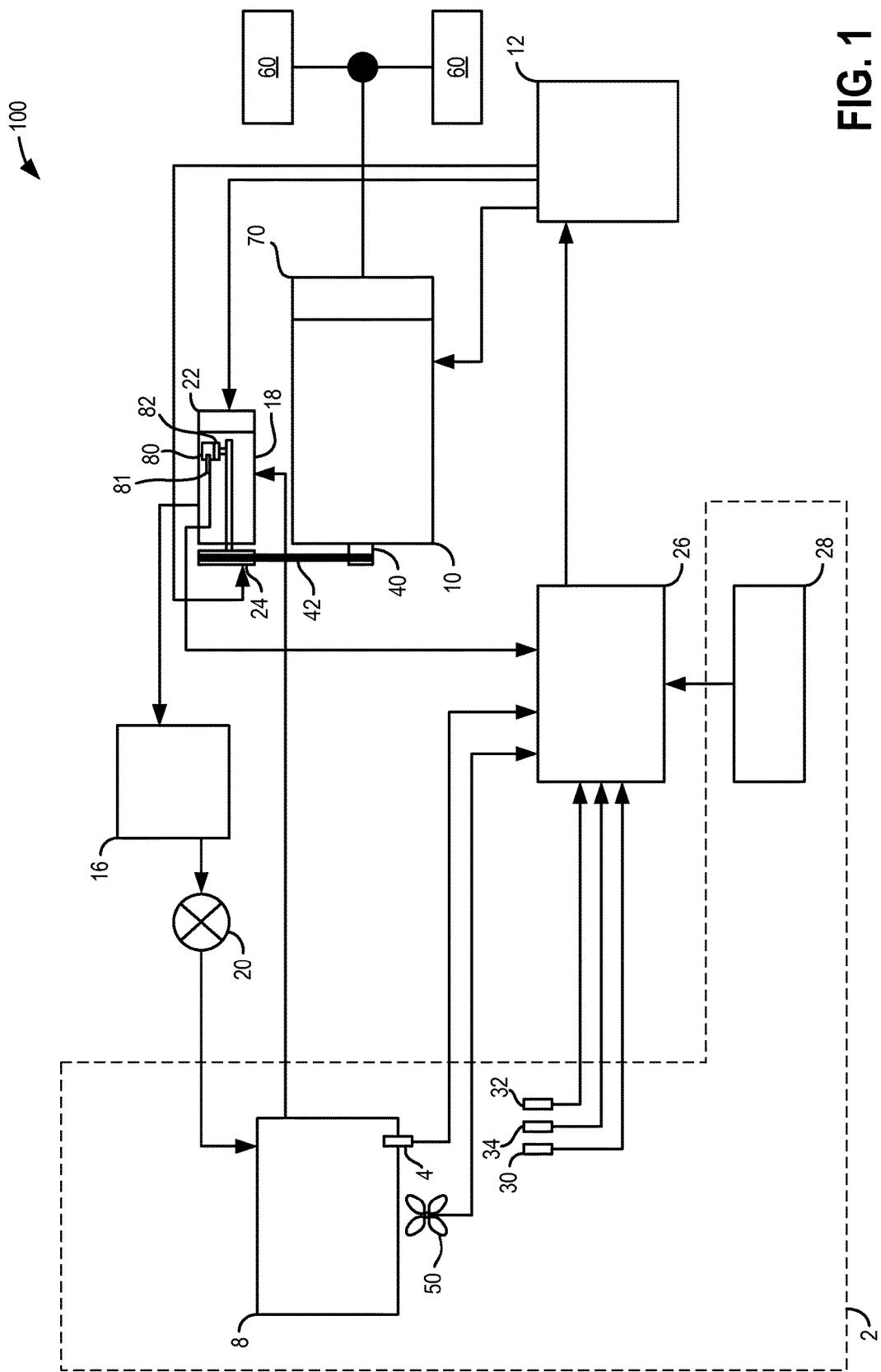
FIG. 1 is a schematic diagram of a vehicle air conditioning system.
Figure 7:
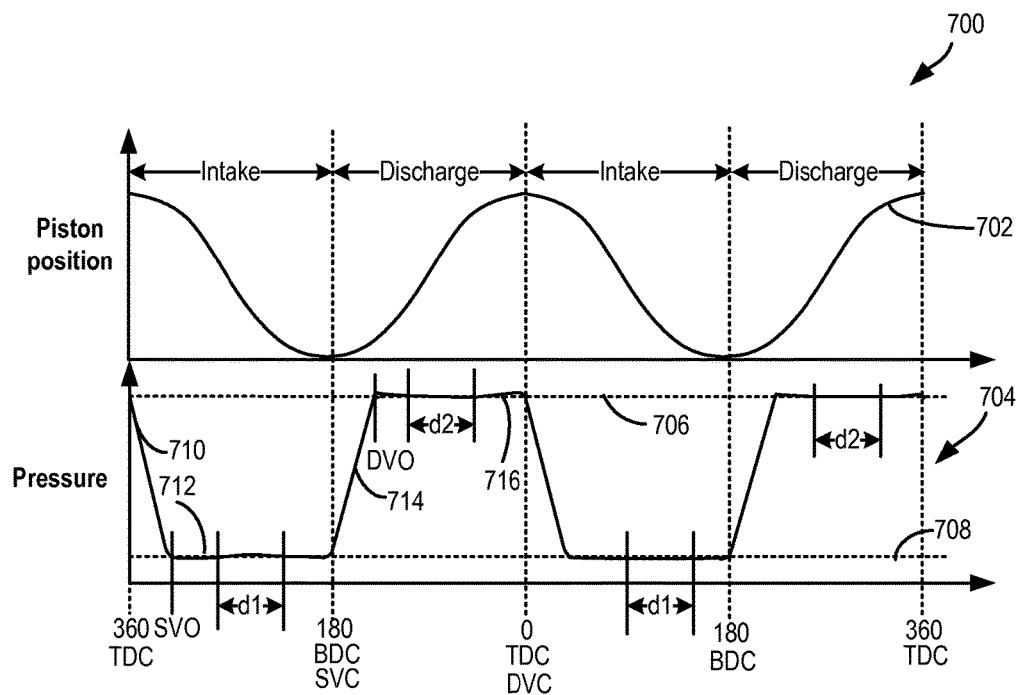
FIG. 7 shows an example compressor cylinder timing diagram including a first window for determining compressor inlet pressure and a second window for determining compressor outlet pressure according to the present disclosure.
Figure 8:
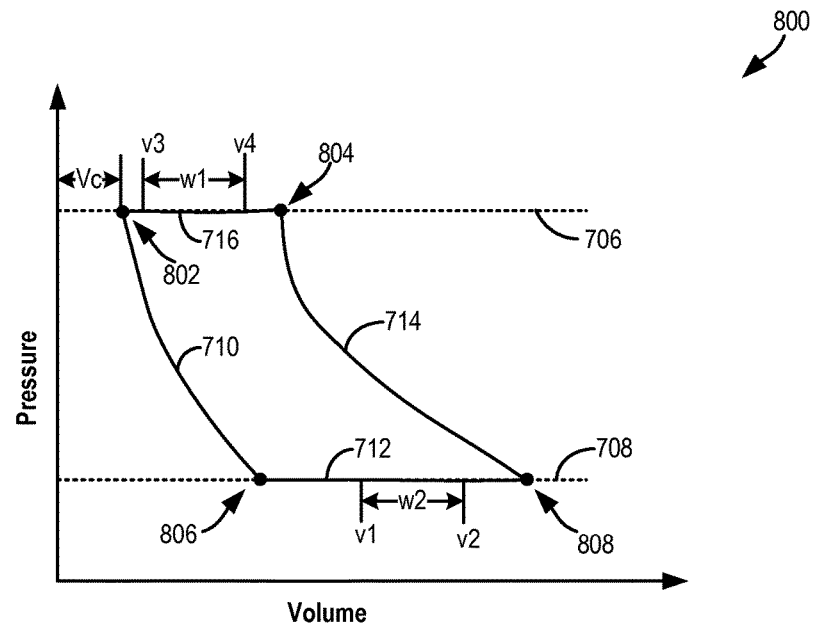
FIG. 8 shows an example pressure-volume graph illustrating operation a compressor cylinder.
Figure 9:
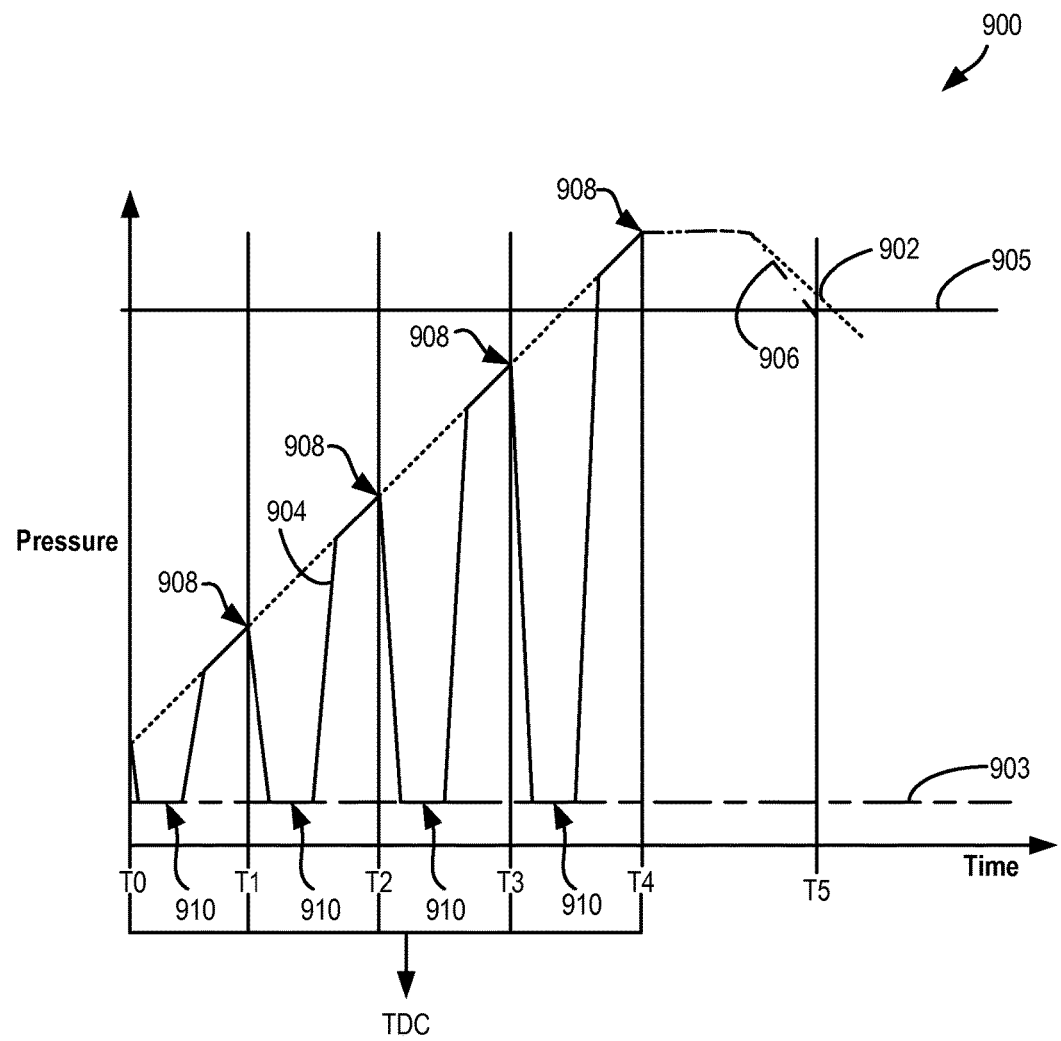
FIG. 9 shows an example compressor cylinder timing diagram indicating change in a compressor cylinder pressure as the compressor outlet pressure build up during compressor operation.

The present description is related to controlling an air conditioning system of a vehicle. Specifically, the description involves controlling an automotive air conditioning based on one or more compressor operating parameters including a compressor inlet pressure, a compressor outlet pressure, and a compressor speed that are determined based on output from a single pressure sensor located within a compression chamber of a compressor of the air conditioning system. In one non-limiting example, the air conditioning system may be configured as illustrated in FIG. 1. Further, in one non-limiting example, the air conditioning system of FIG. 1 may include a compressor, such as the compressor shown at FIG. 2. During vehicle ON conditions, a controller, such as a climate controller 26 at FIG. 1 may be configured to perform control routines according to the methods of FIGS. 4, 5 and 6 to determine a compressor inlet pressure, a compressor outlet pressure, and a compressor speed respectively based on output from a pressure sensor located within a compressor piston to adjust operation of the air conditioning system according to the method of FIG. 3. FIG. 7 shows an example compressor cylinder timing diagram including a first low pressure window and a second high pressure window for determining one or more compressor operating parameters. FIG. 8 shows an example pressure volume curve illustrating changes in pressure and volume during a compressor cylinder cycle and including high pressure and low pressure windows for determining one or more compressor operating parameters. FIG. 9 shows an example change in compressor cylinder pressure including minimum and maximum pressures during the compressor cylinder cycle that is utilized for determining one or more compressor operating parameters.

Referring now to FIG. 1, air conditioning system 100 includes an evaporator 8 for cooling vehicle cabin air. Air is passed over evaporator 8 via fan 50 and directed around vehicle cabin 2. Climate controller 26 operates fan 50 according to operator settings as well as climate sensors. Temperature sensor 4 provides an indication of the temperature of evaporator 8 to climate controller 26. Cabin temperature sensor 30 provides an indication of cabin temperature to climate controller 26. Similarly, humidity sensor 32 provides climate controller 26 an indication of cabin humidity. Sun load sensor 34 provides an indication of cabin heating from sun light to climate controller 26. Climate controller 26 also receives operator inputs from operator interface 28 and supplies desired evaporator temperature and actual evaporator temperature to energy conversion device controller 12. Thus, controller 26 receives signals from the various sensors of FIG. 1 and employs the various actuators to adjust air conditioning system operation based on the received signals and instructions stored on a memory of the controller.

Operator interface 28 allows an operator to select a desired cabin temperature, fan speed, and distribution path for conditioned cabin air. Operator interface 28 may include dials and push buttons to select air conditioning settings. In some examples, operator interface 28 may accept inputs via a touch sensitive display.

Refrigerant is supplied to evaporator 8 via evaporator valve 20 after being pumped into condenser 16. Compressor 18 receives refrigerant gas from evaporator 8 and pressurizes the refrigerant. Heat is extracted from the pressurized refrigerant so that the refrigerant is liquefied at condenser 16. The liquefied refrigerant expands after passing through evaporator valve 20 causing the temperature of evaporator 8 to be reduced.

Compressor 18 includes a clutch 24, a variable displacement control valve 22, piston 80 and swash plate 82. Piston 80 pressurizes refrigerant in air conditioning system which flows from air conditioner compressor 18 to condenser 16. Swash plate 82 adjusts the stroke of piston 80 to adjust the pressure at which refrigerant is output from air conditioner compressor 18 based on oil flow through variable displacement control valve 22. Clutch 24 may be selectively engaged and disengaged to supply air conditioner compressor 18 with rotational energy from energy conversion device 10. For example, clutch 24 may be an electromagnetic clutch; and clutch 24 may be energized by supplying a voltage to the clutch for engagement. In order to disengage clutch 24, zero voltage may be supplied to the clutch. In one example, energy conversion device 10 is an engine supplying rotational energy to compressor 18 and wheels 60 via transmission 70. In other examples, energy conversion device 10 is an electrical motor supplying rotational energy to air conditioner compressor 18 and wheels 60 via transmission 70. Rotational energy may be supplied to air conditioner compressor 18 from energy conversion device 10 via belt 42. In one example, belt 42 mechanically couples shaft 40 to air conditioner compressor 18 via clutch 24. Shaft 40 may be an engine crankshaft, armature shaft, or other shaft.

A pressure sensor 81 is positioned within compression chamber of compressor 18. Specifically, pressure sensor 81 may be located such that the sensing element is exposed to pressures within the compressor chamber. In one example, as shown, pressure sensor 81 may be located within piston 80 of the compressor. In another example, pressure sensor 81 may be located within a cylinder head of the cylinder. In yet another example, pressure sensor 81 may be located within a cylinder wall. Output from pressure sensor 81 during one or more compressor cylinder cycles is utilized for determining one or more compressor operating parameters, including a compressor inlet pressure, a compressor outlet pressure, and a compressor speed. Specifically, the compressor inlet pressure may be determined based on pressure indications from pressure sensor 81 during an intake stroke of piston 80; the compressor outlet pressure may be determined based on pressure indication from pressure sensor 81 during a discharge stroke of piston 80; and the compressor speed may be determined based on a duration to complete on cylinder cycle, where duration for completion of a cylinder cycle may be determined from the output of the pressure sensor. In this way, by utilizing a single pressure sensor located within one of the multiple compression chambers of an air conditioning compressor to determine a compressor inlet pressure, a compressor outlet pressure, and a compressor speed, production cost may be reduced and more compact packaging may be achieved. Details of determining the compressor inlet pressure, the compressor outlet pressure, and the compressor speed; and details of adjusting air conditioning operation based on the determined pressure and speed parameters mentioned above will be further elaborated with respect to FIGS. 3-9.

Controller 12 and/or climate controller 26 receives signals from the various sensors of FIG. 1 and employs the various actuators of FIG. 1 to adjust system operation based on the received signals and instructions stored on a memory of the controller. In one example, the controller 12 and/or the climate controller 26 may receive signals from a pressure sensor 81 and may employ various actuators to adjust control of one or more components of air conditioning system, including clutch 24, and a condenser fan (not shown) based on the received signals. For example, air conditioning system 100 may include a pressure sensor 81 coupled within the compressor compression chamber. As depicted, the pressure sensor 81 may provide a pressure indication to climate controller 26. It will be appreciated that in some examples, the pressure sensor 81 may provide the pressure indications to the energy conversion device controller 12. In yet other examples, the pressure sensor 81 may provide the output to climate controller 26, which in turn may communicate the pressure indication to the energy conversion device controller 12. The climate controller 26 and/or the energy conversion device controller 12 may adjust control of one or more components of air conditioning system based on the pressure indications from pressure sensor 81.

In one example, the system of FIG. 1 provides for an air conditioning system of a vehicle, comprising: an energy conversion device; an air conditioner compressor including a cylinder, the cylinder including a piston, a suction valve, and a discharge valve; a pressure sensor located within one of multiple compression chambers of the compressor; and a controller configured with instructions stored in non-transitory memory, that when executed, cause the controller to: determine a compressor inlet pressure, a compressor outlet pressure, and a compressor speed based on an output from the pressure sensor when the vehicle is ON. The system includes wherein the compressor inlet pressure is determined based on the output from the pressure sensor indicated during an intake stroke of the piston and within a low pressure window occurring between an opening timing of the suction valve and a closing timing of the suction valve during the intake stroke; and wherein the compressor outlet pressure is determined based on the output from the pressure sensor indicated during a discharge stroke of the piston and within a high pressure window occurring between an opening timing of the discharge valve and a closing timing of the discharge valve during the discharge stroke. The system further includes wherein the controller is further configured with instructions stored in non-transitory memory, that when executed, cause the controller to: in response to the compressor speed above a threshold speed, disengaging a clutch coupling the compressor with the energy conversion device when a compressor inlet pressure decreases below a first threshold; disengaging the clutch when a compressor outlet pressure increases above second threshold; and indicating a slippage condition of the clutch when a difference between an expected compressor speed and the compressor speed increases above a threshold difference, the expected compressor speed based on a speed of the energy conversion device.

In one embodiment, the system of FIG. 1 provides for an air conditioning system of a vehicle, comprising: an energy conversion device; an air conditioner compressor including a piston, a variable displacement control valve for adjusting a stroke of the piston, and a clutch selectively coupling the compressor to the energy conversion device; a pressure sensor directly coupled to the piston; and a controller including instructions for: determining that the clutch is engaged based on a compressor speed greater than a threshold, the compressor speed determined based on an output from the pressure sensor directly coupled to the piston; and responsive to determining clutch engagement, commanding the control valve to reduce a length of a stroke of the piston when a compressor inlet pressure decreases below a first threshold, the compressor inlet pressure based on the output from the pressure sensor directly coupled to the piston; and commanding the control valve to reduce a length of a stroke of the piston when a compressor outlet pressure increases above a second threshold, the compressor outlet pressure determined based on the output from the pressure sensor directly coupled to the piston. The system includes wherein the first threshold is less than the second threshold. The system further includes wherein the controller further includes instructions for reducing a current supplied to the clutch to disengage the clutch when the compressor inlet pressure decreases below a third threshold pressure or when the compressor outlet pressure increases above a fourth threshold, the third threshold pressure less than the first threshold; and the fourth threshold pressure greater than the second threshold. The system further includes wherein the energy conversion device is an engine. In some examples, the energy conversion device may be a motor.

While the air conditioning system of FIG. 1 includes a variable displacement compressor, in some examples, the air conditioning system may include a fixed displacement compressor, such as compressor 200 shown in FIG. 2 which will be described below.

Compressor 200 includes a clutch 210, and one or more compressor cylinders 206. Each cylinder 206 includes a piston 202 located within a compression chamber 205. A reciprocating motion of piston 202 is provided by an axial plate 208 (axial plate may also be referred to herein as swash plate or wobble plate). Axial plate 208 may be directly or indirectly driven by an engine crankshaft by means of pulleys and belts. Clutch 210 may be selectively engaged and disengaged to supply air conditioner compressor 200 with rotational energy from an energy conversion device. For example, clutch 210 may be an electromagnetic clutch; and clutch 210 may be energized by supplying a voltage to the clutch for engagement. In order to disengage clutch 210, zero voltage may be supplied to the clutch. In one example, the energy conversion device is an engine supplying rotational energy to compressor 200 via a transmission. In other examples, the energy conversion device is an electrical motor supplying rotational energy to air conditioner compressor 200 via a transmission. Rotational energy may be supplied to air conditioner compressor 200 from the energy conversion device via a belt. In one example, the belt mechanically couples a shaft, such as an engine crankshaft, an armature shaft, or other shaft, to air conditioner compressor 200 via clutch 210. In one example, clutch 210 may be an electromagnetic clutch.

At least one cylinder 206 of compressor 200 includes a pressure sensor 204. In one example, pressure sensor may be positioned within piston 202. In another example, pressure sensor 204 may be positioned within cylinder head. In some other examples, pressure sensor may be located in alternate locations within the cylinder such as, within a suction valve or a discharge valve. In any case, pressure sensor 204 is positioned such that the sensing element is exposed to pressures within compression chamber 205. Thus, pressure sensor 204 provides an indication of pressure of refrigerant vapor within cylinder 206. In other words, the pressure sensor may be directly coupled to the piston or the cylinder head such that an output of the pressure sensor may indicate a pressure of the refrigerant within the cylinder. The pressure indications provided by pressure sensor may be utilized to determine a compressor inlet pressure, a compressor outlet pressure, and a compressor speed as discussed below and further discussed with respect to FIGS. 3-9.

In one example, pressure sensor 204 sends pressure indications to a controller (such as controller 12 and/or climate controller 26 at FIG. 1). The controller may employ various actuators to adjust control of one or more components of an air conditioning system (such as air conditioning system 100 at FIG. 1), including clutch 24, and a condenser fan (not shown) based on the received signals. As depicted, pressure sensor 204 may provide a pressure indication to climate controller 26. It will be appreciated that in some examples, the pressure sensor 204 may provide the pressure indications to an energy conversion device controller (such as, energy conversion device controller 12 at FIG. 1). In yet other examples, the pressure sensor 104 may provide the output to the climate controller, which in turn may communicate the pressure indication to the energy conversion device controller. The climate controller and/or the energy conversion device controller (such as climate controller 26 and/or energy conversion device controller 12 at FIG. 1) may adjust control of one or more components of air conditioning system based on the pressure indications from pressure sensor 204.

Each cylinder 202 of multi-cylinder compressor 200 further includes a suction valve 220 and a discharge valve 222. During compressor operation, when piston 202 is on an intake stroke (that is, when piston 202 is travelling from top dead center (TDC) to bottom dead center (BDC) of the cylinder), low-pressure refrigerant vapor flows into cylinder 206 via suction valve which is forced open when a pressure of refrigerant vapor in suction line 212 increases above an in-cylinder pressure (that is a pressure of refrigerant in the cylinder). Upon opening of suction valve 220, low pressure vapor from suction line 212 flows into cylinder 206 at a first lower constant pressure (which is the pressure of vapor in suction line 212) until the intake stroke is completed. Thus, in one example, pressure indications from pressure sensor 204 during a first window during the intake stroke of piston 202 including pressure sensor 204 may be utilized to determine a pressure of vapor in the suction line, which also referred to herein as compressor inlet pressure. Further, during the intake stroke, discharge valve may be maintained closed by pressure of refrigerant vapor in a discharge line 214. In another example, a minimum pressure indication from the pressure sensor during a compressor cylinder cycle may be utilized to determine the compressor inlet pressure.

During a discharge stroke (that is, when piston 202 is travelling from BDC to TDC of the cylinder), piston 202 compresses refrigerant vapor within cylinder 206. Discharge valve 222 may be forced open during the discharge stroke when the pressure of refrigerant in cylinder 206 increases above a pressure of the refrigerant in discharge line 214. Upon opening of discharge valve 222, high pressure compressed refrigerant vapor may flow into discharge line 214 at a second higher constant pressure (which is pressure of vapor in discharge line 214) until the discharge stroke is completed. Thus, in one example, pressure indications from pressure sensor 204 during a second window during a discharge stroke of piston 202 including pressure sensor 204 may be utilized to determine a pressure of vapor in the discharge line, which also referred to herein as compressor outlet pressure. Further, during the discharge stroke, suction valve may be maintained closed by pressure of refrigerant vapor in cylinder 206. In another example, a maximum pressure indication from the pressure sensor during a compressor cylinder cycle may be utilized to determine the compressor outlet pressure. However, it must be noted that if the clutch is disengaged or the displacement is suddenly reduced, the pressure sensor's maximum value will not reflect the compressor outlet pressure.

Furthermore, a period of compressor cycle may be determined based on pressure changes during the compressor cycle. The period may provide an indication of compressor speed. Further, based on the determined compressor inlet pressure, the compressor outlet pressure, and the compressor speed, operation of the air conditioning system may be adjusted by a climate controller, such as controller 26 at FIG. 1. Details of controlling air conditioning system operation will be described with respect to FIG. 3. Details of determining the compressor inlet pressure, the compressor outlet pressure, and the compressor speed will be further elaborated with respect to FIGS. 4-9.

In this way, a single pressure sensor, such as pressure sensor 204 disposed within a compressor piston may be utilized to determine one or more compressor operating parameters including a compressor inlet pressure, a compressor outlet pressure, and a compressor speed.

Figure 2:
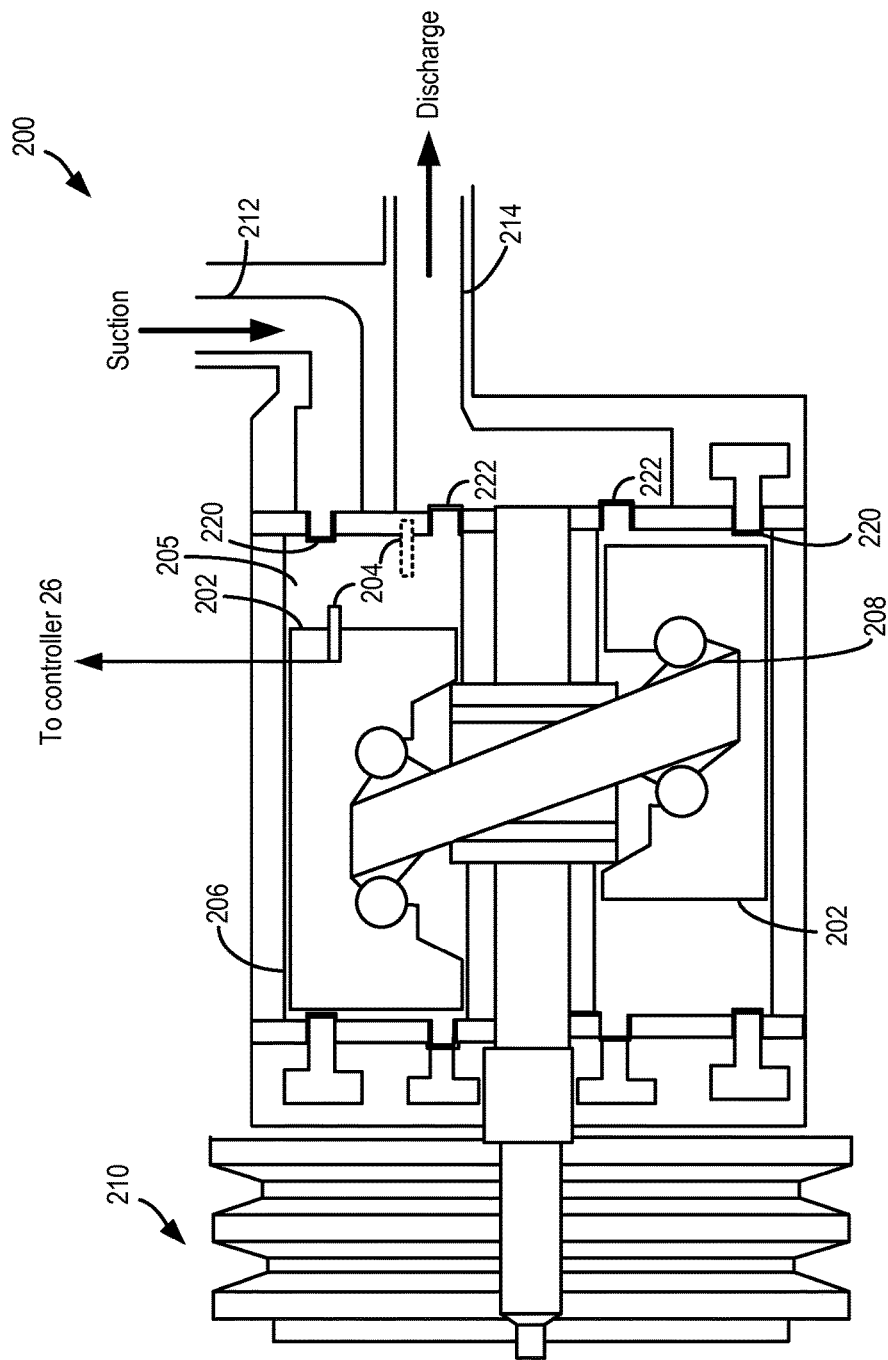
FIG. 2 is a schematic diagram of an example compressor that may be included in the air conditioning system of FIG. 1
Figure 3:
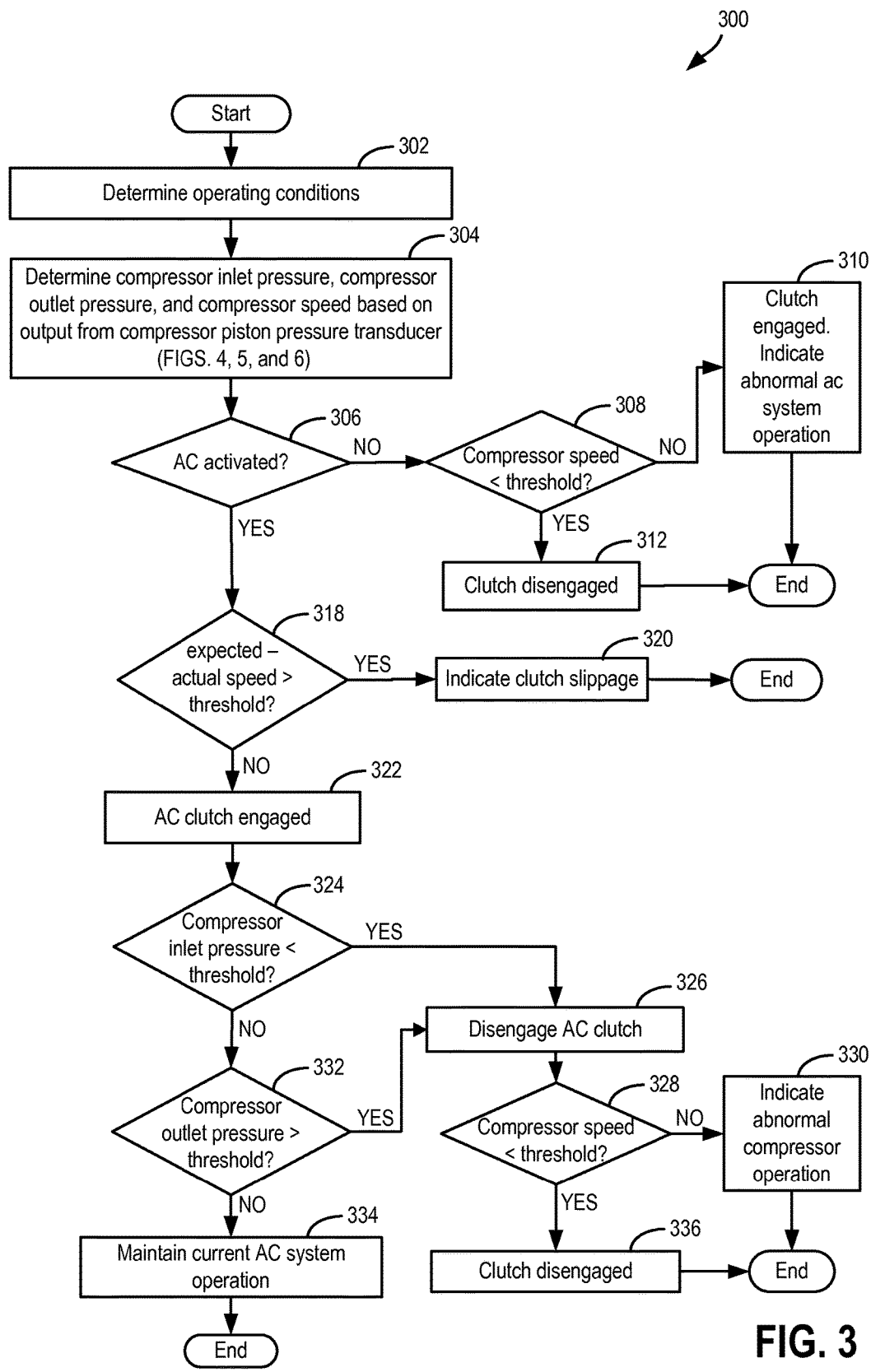
FIG. 3 shows a flowchart illustrating a method for adjusting operation of a vehicle air conditioning system including a compressor according to the present disclosure.

FIG. 3 shows an example method 300 for operating an air conditioning (AC) system (such as air conditioning system 100 at FIG. 1) included in a vehicle according to the present disclosure. Specifically, method 300 relates to operating an air conditioning compressor (such as compressor 18 at FIG. 1) based on output from a pressure sensor (such as pressure sensor 81 at FIG. 1 or pressure sensor 204 at FIG. 2) located within a compression chamber (such as compression chamber 205 at FIG. 2) of the compressor. Method 300 will be described herein with reference to the components and systems depicted in FIGS. 1-2, though it should be understood that the method may be applied to other systems without departing from the scope of this disclosure. Instructions for carrying out method 300 and the rest of the methods included herein may be executed by a controller, such as controller 26 at FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 300 begins at 302. At 302, method 300 includes determining operating conditions. Operating conditions may include air conditioning system operating conditions, energy conversion device operating conditions, and vehicle operating conditions. Operating conditions include but are not limited to air conditioning system status, air conditioning clutch voltage, condenser fan speed, cabin temperature, engine speed, engine load, motor current, and motor speed. Method 300 proceeds to 304 after determining operating conditions.

At 304, method 300 includes determining a compressor inlet pressure, a compressor outlet pressure, and a compressor speed based on output from the pressure sensor located within the compressor piston. For example, the compressor inlet pressure may be determined based on a low pressure component of the pressure sensor output; the compressor outlet pressure may be determined based on a high pressure component of the pressure sensor output; and the compressor speed may be determined based on a rotation period of the compressor cycle that is determined from the pressure sensor output. Thus, the pressure sensor output from the single pressure sensor located within a compression chamber of the compressor may be utilized to determine the compressor inlet pressure, the compressor outlet pressure, and the speed of the compressor. Details of determining the compressor inlet pressure, the compressor outlet pressure, and the compressor speed will be further elaborated with respect to FIGS. 4, 5, and 6 respectively.

Next, method 300 proceeds to 306. At 306, method 300 includes determining if the air conditioning is activated. Determining if the air conditioning is activated may comprise determining an air conditioning system status. The air conditioning system status may comprise a binary value of on (i.e., activated) and off (i.e., not activated). The air conditioning system status may further comprise additional information such as requested cabin temperature. As a non-limiting example, the air conditioning system status may be controlled by an operator of the vehicle via an operator interface. If the operator commands the air conditioning system to be on, for example via the operator interface, then the air conditioning system status is activated, or on. Similarly, if the operator commands the air conditioning system off, then the air conditioning system status is not activated, or off. As such, if the air conditioning system is activated, then an air conditioning clutch (such as clutch 24 at FIG. 1 or clutch 210 at FIG. 2) should be engaged. If the air conditioning system is not activated, then the air conditioning clutch should not be engaged.

In some examples, determining if the air conditioning system is activated further includes determining if cooling is desired while the air conditioning system status is on. For example, the air conditioning system may be on and commanded to produce a specified cabin temperature. When the cabin temperature reaches the specified cabin temperature, the air conditioning may be on but not activated. Thus, the air conditioning system may be only activated while the air conditioning system status is on, however the air conditioning may also be deactivated while the air conditioning system is on. If the commanded cabin temperature differs from the measured cabin temperature, then the air conditioning is activated to bring the difference between commanded and measured cabin temperature to zero.

Upon confirming that the air conditioning is activated, method 300 proceeds to 318. At 318, method 300 includes determining if a difference between an expected compressor speed and an actual compressor speed is greater than a threshold difference. The actual compressor speed may provide an indication of whether the air conditioning clutch is engaged, open, or slipping. The actual compressor speed may be determined at 304 based on output from the pressure sensor. Details of determining the actual compressor speed will be elaborated with respect to FIGS. 6, 7, and 8. The expected compressor speed may be based on a speed of the energy conversion device (such as an engine or a motor).

In one example, upon confirming that the air conditioning is activated, it may be determined if an actual compressor speed is above a threshold speed. The threshold speed may be a predetermined threshold. If the actual compressor speed is less than the threshold speed, then it may be determined that the clutch is not engaged. Herein, the air conditioning clutch may also be simply referred to as the clutch. Further, abnormal air conditioning system operation may be indicated. Indicating abnormal air conditioning system operation may include illuminating a malfunction indicator light. Thus, if the air conditioning system is activated and the compressor is operating below the threshold speed, the air conditioning clutch may not be engaged. In some examples, the determination of whether the actual compressor speed has increased above the threshold may be performed after a threshold duration has passed after activating the AC. Accordingly, if the air conditioning has been active for the threshold duration and if the compressor is operating below the threshold speed after the threshold duration has passed, it may be determined that the air conditioning clutch is not engaged.

In some examples, upon confirming that the clutch is not engaged when the air conditioning system is active, control operations to engage the clutch may be performed by the controller. The control operations may include increasing a voltage supplied to the electromagnetic clutch.

Returning to 318, if the answer at 318 is YES, then the method proceeds to 320. At 320, method 300 includes indicating that the clutch is slipping. Clutch slippage may be indicated with a diagnostic code stored at a controller (such as controller 12, or climate controller 26) and may be further indicated at an in-dash console. Method 300 may subsequently end. If the answer at 318 is NO, then method 300 proceeds to 322. At 322, the controller may indicate that the clutch is engaged and that the compressor is operating normally. The clutch engagement may be indicated by setting a clutch status flag to indicate an active state (e.g., by assigning a first binary value). In one example, upon confirming air conditioning clutch engagement when the air conditioning system is activated, the method may include decreasing a voltage supplied to the clutch until a clutch slip occurs in order to determine a threshold voltage below which clutch slippage may occur. The controller may then adjust voltage to the clutch at the threshold level. For example, a first voltage may be applied to the clutch to engage the clutch, and upon clutch engagement, a second voltage may be applied to the clutch, where the second voltage is less than the first voltage.

Upon indicating that the air conditioning clutch is engaged at 322, method 300 proceeds to 324. At 324, method 300 includes determining if the compressor inlet pressure is less than the threshold. The compressor inlet pressure may be determined based on output from the pressure sensor located within the compressor piston. For example, pressure sensor output during an intake stroke within a constant low pressure window of the compressor piston may be utilized to determine the compressor inlet pressure. Details of determining the compressor inlet pressure will be further elaborated with respect to FIGS. 4, 7, 8, and 9. As such, the compressor inlet pressure may decrease below a threshold when an evaporator supplying low pressure fluid to the compressor is operating under freezing conditions. Accordingly, if the answer at 324 is YES, method 300 proceeds to 326.

At 326, method 300 includes deactivating the air conditioning system. Deactivating the air conditioning system may comprise disengaging the air conditioning clutch. In one example, disengaging the air conditioning clutch may include supplying zero voltage to the air conditioning clutch.

In some examples, if the air conditioning system includes a variable displacement compressor, in response to confirming that the compressor inlet pressure is below a threshold, the controller may adjust a compressor stroke in order to maintain the compressor inlet pressure above the threshold.

Upon disengaging the clutch at 326, method 300 proceeds to 328 to confirm if the clutch has disengaged. The clutch may be confirmed to be disengaged when the speed of the compressor decreases below a threshold speed. Therefore, at 328, method 300 includes confirming if the compressor speed has decreased below the threshold. If the answer at 328 is YES, method 300 proceeds to 336. At 336, method 300 includes indicating that the clutch is disengaged. Indicating that the clutch is disengaged includes setting the clutch status flag to indicate a deactivated state.

If the answer at 328 is NO, method 300 proceeds to 330. If the compressor speed has not decreased below the threshold, it may be determined that the clutch has not fully disengaged. Accordingly, at 330, method 300 includes indicating that the clutch is engaged while the air conditioning system is deactivated. At 330, method 300 may further include indicating abnormal operation of the air conditioning system. Indicating abnormal operation of the air conditioning system may include setting a relevant diagnostic trouble code in the controller and may further include illuminating a malfunction indicator light. Returning to 324, if the answer at 324 is NO the method proceeds to 332. At 332, method 300 includes determining if a compressor outlet pressure is greater than a second threshold pressure. The compressor outlet pressure may be determined based on the output from the pressure sensor located within the compressor piston. For example, when the compressor is adding pressure to the compressor outlet, the peak compression chamber pressure is the compressor outlet pressure. In some examples, pressure sensor output during a discharge stroke within a constant high pressure window of the compressor piston may be utilized to determine the compressor outlet pressure. Details of determining the compressor outlet pressure will be further elaborated with respect to FIGS. 5, 7, 8, and 9. As such, during conditions when the compressor is driven by the engine, the compressor outlet pressure may increase above the second threshold when the engine operates under transient conditions (such as during sudden acceleration from idle). If the answer at 322 is YES, method 300 proceeds to 326 to disengage the clutch and subsequently to 328 to confirm disengagement as discussed above.

In one example, for a fixed displacement compressor, when the clutch is disengaged, the pressure indications from the pressure sensor do not represent the compressor inlet and/or outlet pressure. Therefore, when the compressor clutch is not engaged, compressor outlet pressure may be modelled or estimated based on one or more vehicle operating parameters or air conditioning system operating parameters including a measured compressor outlet temperature and/or previous pressure indications from the pressure sensor when the clutch was engaged. When the modelled outlet pressure decreases below the threshold outlet pressure, the compressor may be turned back on. However, for a variable displacement compressor, pressure indications are continuously available. Therefore, when the compressor outlet pressure indicated by the pressure sensor is above the threshold, a piston stroke of the variable displacement compressor may be reduced to maintain the compressor outlet pressure at or below the threshold.

Returning to 332, if the answer at 332 is NO, the method proceeds to 334. At 334, method 300 includes maintaining air conditioning system operation based on current operating parameters. Method 300 may then end.

Returning to 306, if the air conditioning system is not activated, the method proceeds to 308. At 308, method 300 includes determining if the compressor speed is less than the threshold. If the answer at 308 is YES, then the clutch is disengaged. Therefore, upon confirming that the compressor speed is less than the threshold, method 300 includes indicating that the clutch is disengaged. Indicating clutch disengagement may include setting the clutch status flag to indicate that the clutch is disengaged (e.g., by assigning a second binary value).

However, if the compressor speed is greater than the threshold when the air conditioning is not activated, method 300 proceeds to 310. At 310, method 300 includes indicating that the clutch is engaged. Method 300 further includes indicating that the air conditioning system is not operating normally. Indicating abnormal operation of the air conditioning system may include setting a relevant diagnostic trouble code in the controller and may further include illuminating a malfunction indicator light. In some examples, method 300 may further include performing control operations to disengage the clutch. Control operation to disengage the clutch may include applying zero voltage to the air conditioning clutch.

In this way, operation of a vehicle air conditioning system may be adjusted based on output from a pressure sensor located within a compression chamber of a compressor.

Figure 4:
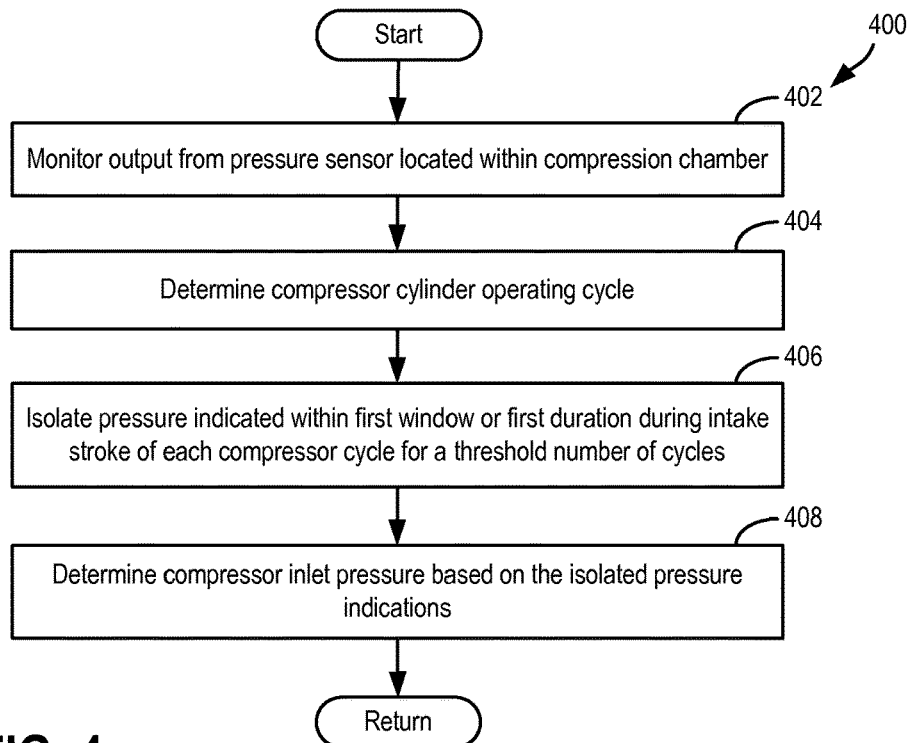
FIG. 4 shows a flowchart illustrating an example method for determining a compressor inlet pressure according to the present disclosure.

Turning to FIG. 4, a method 400 for determining a compressor inlet pressure based on output from a pressure sensor (such as pressure sensor 81 at FIG. 1 or pressure sensor 204 at FIG. 2) located within the compression chamber (such as compression chamber 205 at FIG. 2) is shown. Method 400 may be stored as executable instructions in non-transitory memory of a controller, such as controller 26 shown in FIG. 1. Method 400 is described herein with reference to the components and systems depicted in FIGS. 1 and 2, though it should be understood that the method may be applied to other systems without departing from the scope of this disclosure. Method 400 may be operated in collaboration with method 300 of FIG. 3.

At 402, method 400 includes monitoring an output from the pressure sensor located within the compressor piston. The pressure sensor output may be monitored by a controller, such as controller 26 or controller 12 at FIG. 1, when the air conditioning system is on. For example, the controller may sample pressure sensor output continuously at predetermined intervals (e.g., every one millisecond). The pressure sensor output may be an electrical output, such as voltage or current. The electrical output may then be converted into a pressure measurement by the controller.

Next, method 400 proceeds to 404. At 404, method 400 includes determining an operating cycle of a compressor cylinder (such as cylinder 206 at FIG. 2) including the pressure sensor based on the pressure sensor output.

In one example, operating cycle of the compressor may be further based on a crankshaft angle of a compressor crankshaft, a suction valve position of a suction valve of the compressor cylinder (such as suction valve 220 at FIG. 2), and a discharge valve position of a discharge valve of the compressor cylinder (such as discharge valve 222 at FIG. 2). For example, determining the operating cycle of the compressor may include determining a piston position including determining if the compressor piston is at TDC or at BDC or if the piston is undergoing an intake stroke or a discharge stroke based on a crankshaft angle of the compressor crankshaft and/or based on positions of the suction valve and the discharge valve of the compressor cylinder. In some examples, the compressor operation may be determined with respect to an engine crankshaft.

Determining the operating cycle of the compressor may further include determining in-cylinder pressure of the compressor cylinder based on the pressure sensor output during each cylinder cycle for a threshold number of cylinder cycles. In one example, the threshold number of cylinder cycles may be a predetermined threshold. In another example, the threshold number of cylinder cycles may be based on operating conditions including vehicle operating condition, and air conditioning system operating conditions.

Next, method 400 proceeds to 406. At 406, method 400 includes isolating output of the pressure sensor when the compressor is operating within a first window or a first duration, where the first window occurs during an intake stroke of the piston. The first window is an interval between a first crank angle degree and a second crank angle degree of the compressor crankshaft during the intake stroke of the piston. In some examples, the first window may be an interval between a first crank angle degree and a second crank angle degree of an engine crankshaft during the intake stroke of the compressor piston. In one example, the first window may occur during the intake stroke when the suction valve is open and the discharge valve is closed. Specifically, the first window may occur during the intake stroke after the suction valve is opened and before the suction valve is closed. As such, during the intake stroke, the discharge valve may be closed. In another example, the first window may correspond to an interval during the intake stroke when the cylinder pressure is constant. In still another example, the first window may correspond to an interval during the intake stroke when a cylinder volume is greater than a first threshold and less than a second threshold, where the second threshold is greater than the first threshold. In yet another example, the first window may begin after a first predetermined number of crankshaft angles after the suction valve is opened, and may end before a second predetermined number of crankshaft angles before the suction valve is closed (that is, before the piston reaches the BDC) during the intake stroke. Upon isolating the pressure sensor output during the first window during the intake stroke, method 400 proceeds to 408. At 408, method 400 includes determining a compressor inlet pressure based on the isolated pressure sensor output. Determining the compressor inlet pressure may include determining pressure measurements based on the pressure sensor output isolated during the first window over a threshold number of cylinder cycles. In one example, the pressure measurements determined during the first window of each cylinder cycle over a threshold number of cylinder cycles may be averaged to determine the compressor inlet pressure. In some other examples, the lowest pressure measurement determined during the first window during each cycle for a threshold number of cylinder cycles may be averaged to determine the compressor inlet pressure. Upon determining the compressor inlet pressure, method 400 returns.

While the above example illustrates isolating a low pressure component of the pressure sensor output during a first window during an intake stroke of the piston, in some examples, the minimum pressure of the compression chamber during a compressor cycle may be utilized to determine the compressor inlet pressure. For example, the minimum pressure over a cycle is equal to the compressor inlet pressure. Therefore, the minimum pressure indication is utilized to determine the compressor inlet pressure.

In this way, output from a pressure sensor located within a compression chamber of an air conditioning compressor may be utilized to determine a compressor inlet pressure.

Figure 5:
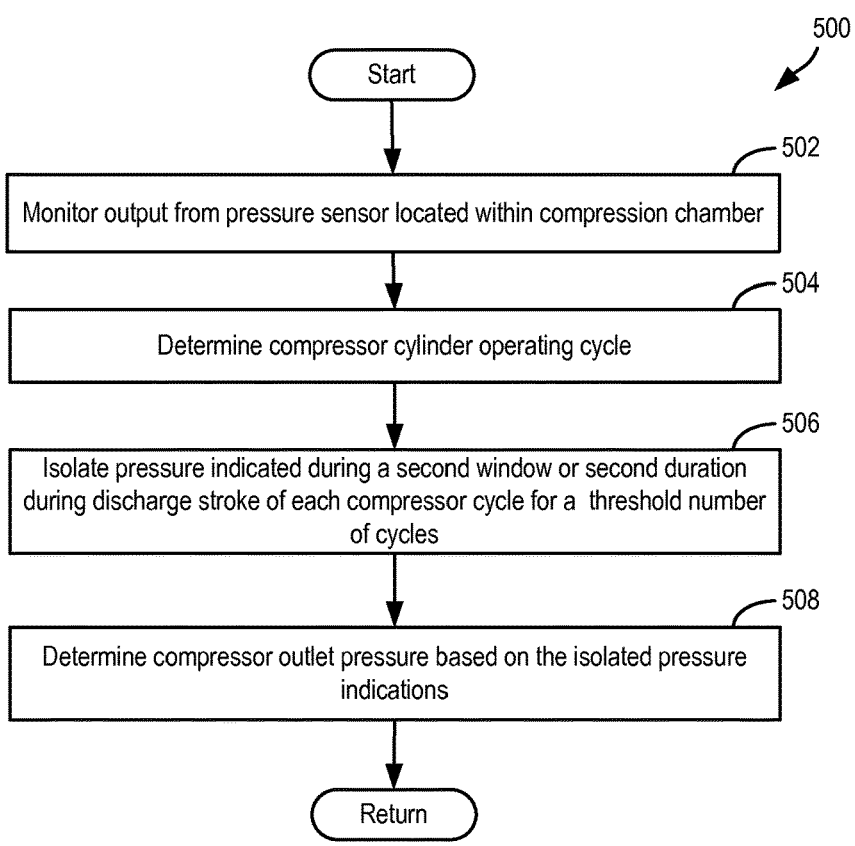
FIG. 5 shows a flowchart illustrating an example method for determining a compressor outlet pressure according to the present disclosure.

Turning to FIG. 5, a method 500 for determining a compressor outlet pressure based on output from a pressure sensor (such as pressure sensor 81 at FIG. 1 or pressure sensor 204 at FIG. 2) located within the compressor's compression chamber (such as compression chamber 205 at FIG. 2) is shown. Method 500 may be stored as executable instructions in non-transitory memory of a controller, such as controller 26 or controller 12 shown in FIG. 1. Method 500 is described herein with reference to the components and systems depicted in FIGS. 1 and 2, though it should be understood that the method may be applied to other systems without departing from the scope of this disclosure. Method 500 may be operated in collaboration with method 300 of FIG. 3.

At 502, method 500 includes monitoring an output from the pressure sensor located within the compressor piston. The pressure sensor output may be monitored by a controller, such as controller 26 at FIG. 1, when the air conditioning system is on. For example, the controller may sample pressure sensor output continuously at predetermined intervals (e.g., every one millisecond). The pressure sensor output may be an electrical output, such as voltage or current. The electrical output may then be converted into a pressure measurement by the controller.

Next, method 500 proceeds to 504. At 504, method 500 includes determining an operating cycle of a compressor cylinder (such as cylinder 206 at FIG. 2) including the pressure sensor based on the pressure sensor output. As discussed above with respect to FIG. 4, in one example, the operating cycle of the compressor cylinder may be further based on a crankshaft angle of a compressor crankshaft, a suction valve position of a suction valve of the compressor cylinder (such as suction valve 220 at FIG. 2), and a discharge valve position of a discharge valve of the compressor cylinder (such as discharge valve 222 at FIG. 2). For example, determining the operating cycle of the compressor may include determining a piston position including determining if the compressor piston is at TDC or at BDC or if the piston is undergoing an intake stroke or a discharge stroke based on a crankshaft angle of the compressor crankshaft and/or based on positions of the suction valve and the discharge valve of the compressor cylinder. In some examples, the compressor operation may be determined with respect to an engine crankshaft. Determining the operating cycle of the compressor may further include determining in-cylinder pressure of the compressor cylinder based on the pressure sensor output during each cylinder cycle for a threshold number of cylinder cycles. In one example, the threshold number of cylinder cycles may be a predetermined threshold. In another example, the threshold number of cylinder cycles may be based on operating conditions including vehicle operating condition, and air conditioning system operating conditions. Next, method 500 proceeds to 506. At 506, method 500 includes isolating output of the pressure sensor when the compressor is operating within a second window or a second duration, where the second window occurs during a discharge stroke of the piston. The second window is an interval between a third crank angle degree and a fourth crank angle degree of the compressor crankshaft during the discharge stroke of the piston. In one example, the second window may occur during the discharge stroke when the suction valve is closed and the discharge valve is open. Specifically, the second window may occur during the discharge stroke after the discharge valve is opened and before the discharge valve is closed. As such, during the discharge stroke, the suction valve may be closed. In another example, the second window may correspond to an interval during the discharge stroke when the cylinder pressure is constant. In still another example, the second window may correspond to an interval during the intake stroke when a cylinder volume is greater than a third threshold and less than a fourth threshold, where the fourth threshold is greater than the third threshold but less than the first threshold. In yet another example, the second window may begin after a first predetermined number of crankshaft angles after the discharge valve is opened, and may end before a second predetermined number of crankshaft angles before the discharge valve is closed (that is, before the piston reaches the TDC) during the discharge stroke.

Upon isolating the pressure sensor output during the second window during the discharge stroke, method 500 proceeds to 508. At 508, method 500 includes determining a compressor outlet pressure based on the isolated pressure sensor output. Determining the compressor outlet pressure may include determining pressure measurements based on the pressure sensor output isolated during the second window during each cycle for a threshold number of cylinder cycles.

In one example, the pressure measurements determined during the second window of each cylinder cycle over a threshold number of cylinder cycles may be averaged to determine the compressor outlet pressure. In some other examples, the highest pressure measurement determined during the second window during each cycle for a threshold number of cylinder cycles may be averaged to determine the compressor outlet pressure. Upon determining the compressor outlet pressure, method 500 returns.

While the above example illustrates isolating a high pressure component of the pressure sensor output during a second window during a discharge stroke of the piston, in some examples, the maximum pressure indications from the pressure sensor output may be isolated from the minimum pressure indications; and the maximum pressure indication of the compression chamber during a compressor cycle may be utilized to determine the compressor outlet pressure. For example, the maximum pressure over a cycle is equal to the compressor outlet pressure. Therefore, the maximum pressure indication is utilized to determine the compressor outlet pressure.

In this way, output from a pressure sensor located within a compression chamber of an air conditioning compressor may be utilized to determine a compressor outlet pressure.

Figure 6:
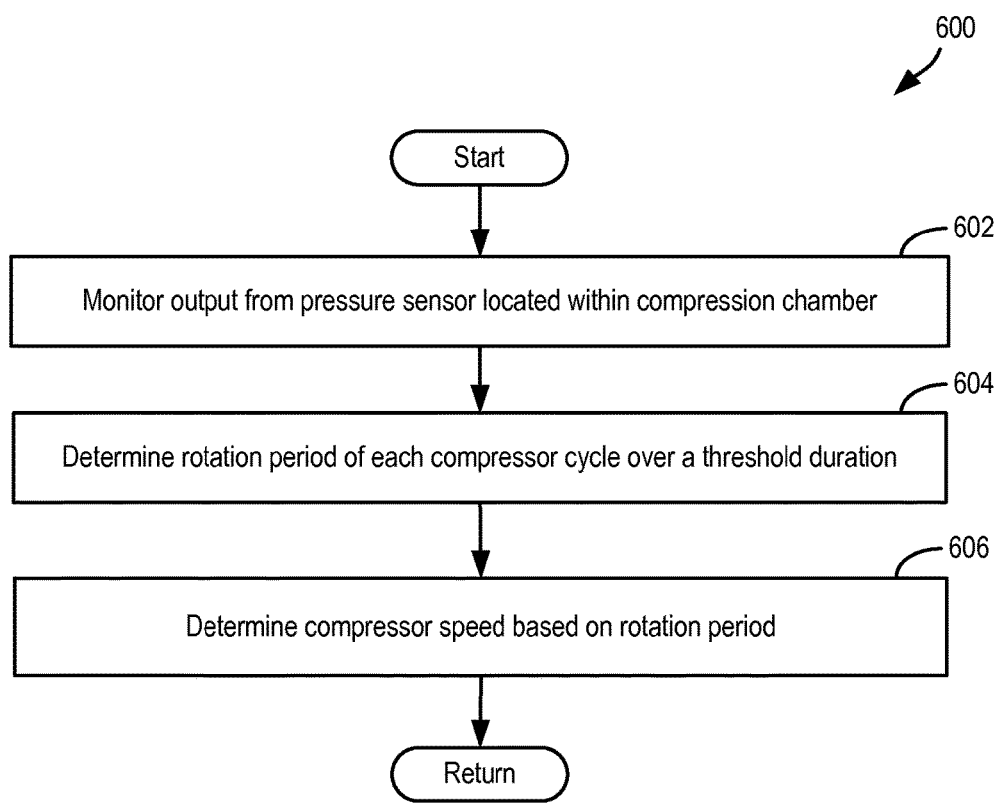
FIG. 6 shows a flowchart illustrating an example method for determining a compressor speed according to the present disclosure.

Turning to FIG. 6, a method 600 for determining a compressor speed based on output from a pressure sensor (such as pressure sensor 81 at FIG. 1 or pressure sensor 204 at FIG. 2) located within a compression chamber (such as compression chamber 205 at FIG. 2) of the compressor is shown. Method 600 may be stored as executable instructions in non-transitory memory of a controller, such as controller 26 or controller 12 shown in FIG. 1. Method 600 is described herein with reference to the components and systems depicted in FIG. 1, though it should be understood that the method may be applied to other systems without departing from the scope of this disclosure. Method 600 may be operated in collaboration with method 300 of FIG. 3.

At 602, method 600 includes monitoring an output from the pressure sensor located within the compressor piston. The pressure sensor output may be monitored by a controller, such as controller 26 at FIG. 1, when the air conditioning system is on. For example, the controller may sample pressure sensor output continuously at predetermined intervals (e.g. every one millisecond). The pressure sensor output may be an electrical output, such as voltage or current. The electrical output may then be converted into a pressure measurement by the controller.

Next, method 600 proceeds to 604. At 604, method 600 includes determining an operating cycle of a compressor cylinder (such as cylinder 206 at FIG. 2) including the pressure sensor based on the pressure sensor output, crankshaft angle of a compressor crankshaft, a suction valve position of a suction valve of the compressor cylinder (such as suction valve 220 at FIG. 2), and a discharge valve position of a discharge valve of the compressor cylinder (such as discharge valve 222 at FIG. 2). For example, determining the operating cycle of the compressor cylinder may include determining a piston position, which includes determining if the compressor piston is at TDC or at BDC or if the piston is undergoing an intake stroke or a discharge stroke based on a crankshaft angle of the compressor crankshaft and/or based on positions of the suction valve and the discharge valve of the compressor cylinder. Determining the operating cycle of the compressor may further include determining in-cylinder pressure of the compressor cylinder based on the pressure sensor output during each cylinder cycle for a threshold number of cylinder cycles. In some examples, output of the pressure sensor alone may be utilized to infer cylinder cycle.

Next, method 600 proceeds to 606. At 606, method 600 includes determining a rotation period of the compressor cylinder cycle. The rotation period is a duration for the cylinder piston to complete one cylinder cycle starting from TDC traveling to BDC during the intake stroke and reaching BDC at the end of the intake stroke, and the traveling to TDC during the discharge stroke and reaching TDC at the end of the discharge stroke. As an example, during some operating conditions, the cylinder may take hundred milliseconds to complete one cycle (one cycle may correspond to one revolution of the compressor crankshaft). Therefore, the rotation period may be determined to be 100 milliseconds.

Upon determining the rotation period, method 600 proceeds to 608. At 608, method 600 includes determining a compressor speed based on the rotation period. For example, if the rotation period is 100 milliseconds, the compressor speed may be determined to be 600 revolutions per minute.

In this way, a compressor speed may be determined based on output from a pressure sensor located within a compressor piston. Thus, a single pressure sensor located within a compression chamber of a compressor may be utilized to determine a compressor inlet pressure, a compressor outlet pressure and a compressor speed, thereby obviating the need for two pressure sensors (one for measuring a compressor inlet pressure placed within a compressor inlet line and one for a compressor outlet pressure placed within a compressor outlet line). As a result, production cost may be reduced and more compact packaging may be achieved.

In one example, the methods described at FIGS. 3-6 may provide for a method for a vehicle air conditioning system, comprising: estimating an inlet pressure and an outlet pressure of a compressor based on an output of a pressure sensor located within a compression chamber of the compressor; disengaging a compressor clutch in response to the inlet pressure below a first threshold pressure; and increasing a condenser fan speed in response to the outlet pressure above a second threshold pressure. The method further includes wherein estimating the inlet pressure includes isolating a low pressure component from the pressure sensor output obtained within a duration, the duration based on a number of compressor cycles; and wherein estimating the high side pressure includes isolating a high pressure component from the pressure sensor output obtained within the duration. The method further includes wherein the low pressure component is based on the pressure output indicated during an intake stroke of the piston; and wherein the high pressure component is based on the pressure output indicated during a discharge stroke of the piston; and wherein the low pressure component is further based on the pressure output indicated during a first window during the intake stroke of the piston, the first window occurring when a suction valve of a cylinder including the piston is open and a discharge valve of the cylinder is closed; and wherein the low pressure component is further based on the pressure output indicated during a second window during the discharge stroke of the piston, the second window occurring when the suction valve is closed and the discharge valve is open. The method further includes wherein estimating the inlet pressure further includes averaging the low pressure component isolated over the number of compressor cycles; and wherein estimating the outlet pressure further includes averaging the high pressure component isolated over the number of compressor cycles.

The method further comprises disengaging the compressor clutch in response to the high side pressure above a third threshold, wherein the first threshold is less than the second threshold, and the second threshold is less than the third threshold.

The method further comprises estimating a speed of the compressor based on the output of the pressure sensor; and further comprises determining clutch engagement based on the speed of the compressor above a threshold speed; and indicating a slippage condition of the clutch responsive to a difference between an expected compressor speed and the estimated speed of the compressor greater than a threshold, the expected compressor speed based on a speed of an energy conversion device driving the compressor.

In another example, the methods described at FIGS. 3-6 may provide for a method for a vehicle air conditioning system, comprising: adjusting an air conditioning control parameter based on an inlet pressure of a refrigerant entering a compressor estimated based on one or more pressure indications of a pressure sensor indicated within a first window of a rotation period of a compressor cycle; and adjusting a different air conditioning control parameter based on an outlet pressure of the refrigerant exiting the compressor estimated based on one or more pressure indications of the pressure sensor measured within a second window of the rotation period, wherein the pressure sensor is located within a compression chamber of the compressor. The method includes wherein estimating the inlet pressure includes averaging one or more pressure indications indicated within the first window; and wherein estimating the outlet pressure includes averaging one or more pressure readings indications within the second window. The method further includes wherein the first window occurs during an inlet stroke of the compressor piston between a first crank angle degree and a second crank angle degree; and wherein the second window occurs during a discharge stroke of the compressor piston between a third crank angle degree and a fourth crank angle degree; and wherein estimating the inlet pressure includes determining a lowest pressure during the first window during each compressor cycle for a threshold number of compressor cycles and computing a first average of the lowest pressures; and wherein estimating the outlet pressure includes determining a highest pressure during the second window during each compressor cycle for the threshold number of compressor cycles and computing a second average of the highest pressures.

The method further includes wherein adjusting the air conditioning control parameter includes reducing a current supplied to an electromagnetic compressor clutch to disengage the compressor clutch in response to the inlet pressure below a first threshold pressure; and wherein adjusting a different air conditioning control parameter includes increasing a condenser fan speed in response to the outlet pressure above a second threshold pressure, the second threshold pressure greater than the first.

Turning to FIG. 7, map 700 illustrates a compressor cylinder timing diagram of a cylinder in a reciprocating piston compressor. The compressor may be a variable displacement compressor (such as compressor 18 at FIG. 1) or a fixed displacement compressor (such as compressor 200 at FIG. 2). Specifically, map 700 includes a first window in a compressor cylinder cycle for determining a compressor inlet pressure, and a second window in the compressor cylinder cycle for determining a compressor outlet pressure. Map 700 illustrates a rotation of a compressor crankshaft along the x-axis in crank angle degrees (CAD). Curve 702 depicts piston positions (along the y-axis) of a compressor cylinder piston, with reference to their location before top dead center discharge stroke and after top dead center discharge stroke. While the present example indicates compressor piston positions with respect to positions of a compressor crankshaft, in some examples, piston position of the compressor cylinder may be determined with respect to an engine crankshaft position. For example, in systems where the reciprocating motion of the compressor is provided by an axial plate (such as axial plate 208 of compressor 200 shown at FIG. 2 or swash plate 82 of compressor 18 shown at FIG. 1) that is driven directly or indirectly by a main shaft of an engine crankshaft, piston position of the compressor cylinder may be indicated with respect to position of the engine crankshaft in crank angle degrees. As such, in example where the compressor cylinder piston is driven by a compressor crankshaft, the compressor crankshaft is directly or indirectly driven by an engine crankshaft via pulleys and belts.

Time progresses from left to right. Each stroke of the compressor cylinder is shown as indicated above sinusoidal curve 702. The strokes are separated by vertical lines. The sequence begins at a timing of 360 crankshaft degrees before TDC discharge stroke. Suction valve closing locations are indicated by SVC. Suction valve opening locations are indicated by SVO. Discharge valve closing locations are indicated by DVC. Discharge valve opening locations are indicated by DVO. As indicated by sinusoidal curve 710, a piston gradually moves downward from TDC, bottoming out at BDC by the end of the intake stroke. The piston then returns to the top, at TDC, by the end of the discharge stroke. The piston then again moves back down, towards BDC, during a subsequent intake stroke, and returns to its original top position at TDC by the end of a subsequent discharge stroke.

The second plot 704 of map 700 depicts an example cylinder pressure profile of a compressor cylinder indicated by a pressure transducer positioned within a compression chamber of the compressor cylinder. As such, at any given time point, the cylinder pressure may be a pressure of refrigerant vapor in the cylinder.

A cylinder cycle may begin at TDC intake stroke and end at TDC discharge stroke 360 crankshaft degrees later. When the piston is at TDC intake stroke, both the suction valve and the discharge valve are closed. As the piston moves downward during the intake stroke, vapor trapped in a clearance space of the cylinder expands. Thus, the pressure in the cylinder decreases as a volume of the vapor increases, as indicated by segment 710. When the pressure in the cylinder decreases below a pressure of the vapor in a suction line (such as line 212 at FIG. 2), the suction valve is forced open by the higher pressure of vapor in the suction line and vapor from the suction line flows into the cylinder. Opening of the suction valve is indicated as SVO. Thus, the flow of vapor into the cylinder beings when the suction valve opens SVO and continues until the piston reaches BDC. At the same time, the discharge valve is held closed by higher pressure of vapor in the discharge line. During the time between opening of the suction valve and the piston reaching BDC with intake stroke, the pressure in the cylinder remains nearly constant (indicated by segment 712) at compressor inlet pressure (708). Therefore, pressure indications from the pressure sensor located within the cylinder piston during the time between opening of the inlet valve and the piston reaching the BDC may be utilized to determine a compressor inlet pressure. Accordingly, pressure indications during a first window d1 during the intake stroke of the compressor piston is utilized to determine the compressor inlet pressure, where the first window beings after a first threshold crank angle degrees after SVO and ends before a second threshold crank angle degrees before the piston reaches BDC intake stroke. When the piston reaches BDC intake stroke, the suction valve closes and the discharge stroke begins. Closing of the suction valve is indicated as SVC.

During the discharge stroke, the piston moves upward from BDC compressing the vapor in the cylinder. As a result, the pressure of vapor in the cylinder increases, as indicated by segment 714. When the pressure of vapor in the cylinder increases above the pressure of vapor in the discharge line, the discharge valve is forced open by the higher pressure of vapor in the cylinder, which also maintains the suction valve closed. Opening of the discharge valve is indicated as DVO. The opening of the discharge vale causes the high pressure compressed vapor to flow from the cylinder into the discharge line through the discharge valve. The flow of high pressure compressed vapor from the cylinder begins when the discharge valve opens and continues until the compressor piston reaches TDC on the discharge stroke. During the time between the opening of the discharge valve and the piston reaching TDC on the discharge stroke, the pressure in the cylinder remains nearly constant (as indicated by segment 716) at the compressor outlet pressure (706). Therefore, pressure indications from the pressure sensor located within the cylinder piston during the time between opening of the discharge valve and the piston reaching the TDC on the discharge stroke may be utilized to determine a compressor outlet pressure. Accordingly, pressure indications during a second window d2 during the discharge stroke of the compressor piston is utilized to determine the compressor outlet pressure, where the second window beings after a third threshold crank angle degrees after DVO and ends before a fourth threshold crank angle degrees before the piston reaches TDC on the discharge stroke.

When the piston reaches TDC on the discharge stroke, a compressor cylinder cycle is complete and the crank shaft of the compressor has rotated one complete revolution. Thus, a period of the compressor cylinder cycle indicating a duration to complete one compressor cylinder cycle may be utilized to determine a compressor speed. For example, if a period to completer one cylinder cycle is indicated as P, then the compressor speed may be determined as 1/P (one divided by period P). As an example, if a compressor cylinder takes hundred milliseconds to complete one cycle, the rotation period of the cylinder may be determined to be 100 milliseconds and the compressor speed may be determined to be 600 revolutions per minute. In this way, a compressor inlet pressure, a compressor outlet pressure, and a compressor speed may be determined based on output from a single pressure sensor located within a compressor piston.

FIG. 8 shows a map 800 indicating volume of a refrigerant vapor in a compressor cylinder versus pressure of the vapor in the cylinder during a cylinder cycle. Specifically, map 800 illustrates a refrigerant vapor volume along the x-axis and a refrigerant vapor pressure along the y-axis.

At 802, the piston may be at TDC, and the suction and the discharge valve are closed. In order to prevent the piston from striking a valve plate at TDC, compressor cylinders are designed with a clearance volume, indicated as Vc. During the intake stroke, as the piston moves downwards, the vapor in the clearance space expands increasing in volume, as indicated by segment 710. At 806 when the pressure in the cylinder decreases just below the suction pressure (that is, pressure of vapor in the suction line) the higher pressure in the suction line forces the suction valve to open and the vapor flows from the suction line into the cylinder. As the piston continues to travel towards BDC, the volume of the vapor increases while the pressure remains nearly constant at suction pressure, as indicated by segment 712. As such, the suction pressure is an indication of the compressor inlet pressure. Therefore, pressure indications from a pressure sensor located within the piston may be utilized to determine a compressor inlet pressure when the compressor cylinder is operating in a window w2, during which the cylinder pressure is nearly constant and a volume of vapor in the cylinder is between a first threshold v1 and a second threshold v2. Accordingly, in one example, during a first constant pressure window of a compressor cylinder cycle when a volume of vapor in the cylinder is between a first threshold volume and a second threshold volume, pressure indications from a compressor piston pressure sensor located within a compression chamber of the cylinder is utilized to determine the compressor inlet pressure. Further, the first constant pressure window may occur during an intake stroke of the piston.

At 808 the piston reaches the BDC and the discharge stroke begins. At BDC, the suction and the discharge valves are closed. During the discharge stroke, the piston moves upwards from BDC, thereby compressing the vapor within the cylinder. As the vapor is compressed, the vapor volume increases and the pressure increases, as indicated by segment 714. At point 804, pressure of the vapor in the cylinder increases above the discharge pressure (that is pressure of vapor in the discharge line). The higher pressure of vapor in the cylinder forces the discharge valve to open. As the piston continues to travel towards TDC on the discharge stroke, the high-pressure compressed vapor flows into the discharge line from the cylinder via the discharge valve at nearly constant pressure, as indicated by segment 716. As such, the discharge pressure is an indication of the compressor outlet pressure. Therefore, pressure indications from a pressure sensor located within the piston may be utilized to determine a compressor outlet pressure when the compressor cylinder is operating in a window w1, during which the cylinder pressure is nearly constant and a volume of vapor in the cylinder is between a third threshold v3 and a fourth threshold v4. Further, the third threshold may be less than the fourth threshold, which may be less than the first threshold, and the first threshold may be less than the second threshold. Accordingly, in one example, during a second constant pressure window of a compressor cylinder cycle when a volume of vapor in the cylinder is between a third threshold volume and a fourth threshold volume, pressure indications from a compressor piston pressure sensor located within a compression chamber of the cylinder is utilized to determine the compressor outlet pressure. Further, the second constant pressure window may occur during a discharge stroke of the piston.

Thus, during a first low pressure window during an intake stroke of a compressor piston, an output of an in-cylinder pressure sensor located within the piston may be utilized to determine a compressor inlet pressure; and during a second high pressure window during a discharge stroke of the piston, the output may be utilized to determine a compressor outlet pressure.

FIG. 9 shows an example graph 900 depicting pressure along the y-axis versus time along the x-axis. Graph 900 includes trace 904 indicating change in pressure within a compression chamber (such as compression chamber 205 at FIG. 2) of an air conditioning compressor. The pressure within the compression chamber may be indicated by a pressure sensor (such as pressure sensor 81 at FIG. 1 or pressure sensor 204 at FIG. 2) located within the compression chamber. Graph 900 further includes trace 902 indicating an actual compressor outlet pressure; trace 903 indicating an actual compressor inlet pressure; and trace 906 indicating modelled (or predicted) compressor outlet pressure when an air conditioning clutch is disengaged. Graph 900 further includes points 908 indicating maximum compression chamber pressures determined based on an output from the pressure sensor during each compressor cylinder cycle; and points 910 indicating minimum compression chamber pressures determined based on the output from the pressure sensor during each compressor cylinder cycle.

Time progresses from left to right. At time T0, T1, T2, T3, and T4, a compressor piston included within the compression chamber of the compressor may be at TDC. The compressor may complete one cylinder cycle between each time point T0, T1, T2, T3, and T4. Between T0 and T4, as time progresses, the compressor is operating (clutch engaged), and the actual compressor outlet pressure increases as indicated by 902. Further, as the compressor is operating, the maximum pressure within the compression chamber during each cylinder cycle equals the compressor outlet pressure; and the minimum pressure within the compression chamber during each cylinder cycle equals the compressor inlet pressure. Thus, the peaks (indicated by points 908) represent compressor outlet pressure while the troughs (indicated by points 910) represent compressor inlet pressure. Therefore, by isolating the peaks and troughs from the pressure sensor output, the compressor outlet pressure and the compressor inlet pressure may be determined. For example, a maximum pressure indication between two minimum pressure indications may be utilized to determine the compressor outlet pressure. Likewise, a minimum pressure indication between two maximum pressure indications may be utilized to determine the compressor inlet pressure. Further, a time period to complete one cylinder cycle is directly proportional to compressor speed. Therefore, the pressure indications may also be utilized to determine a compressor speed.

At T4, the compressor outlet pressure as indicated by the pressure sensor output is above a threshold outlet pressure indicated by horizontal line 905. Therefore, the compressor may be turned off at T4. For a fixed displacement compressor, as shown in this example, when the compressor is turned off (e.g., by disengaging a compressor clutch), the pressure indications from the pressure sensor do not represent the compressor inlet and/or outlet pressure. Therefore, in one example, when the compressor is turned off, compressor outlet pressure may be modelled or estimated based on one or more vehicle operating parameters or air conditioning system operating parameters including a measured compressor outlet temperature. When the modelled outlet pressure decreases below the threshold outlet pressure (T5), the compressor may be turned on. However, for a continuously engaged compressor that varies its displacement instead of cycling a clutch (that is, for a variable displacement compressor), pressure indications are continuously available.

Therefore, for a variable displacement compressor, when the compressor outlet pressure indicated by the pressure sensor is above the threshold, a piston stroke may be reduced to maintain the compressor outlet pressure at or below the threshold.

In one example, the systems and methods described at FIGS. 1-9 provide for an air conditioning system of a vehicle, comprising: an energy conversion device; an air conditioner compressor including a cylinder, the cylinder including a compression chamber, a piston, a suction valve, and a discharge valve; a pressure sensor located within the compression chamber of the cylinder; and a controller configured with instructions stored in non-transitory memory, that when executed, cause the controller to: determine a compressor inlet pressure and a compressor outlet pressure based on an output from the pressure sensor when the vehicle is ON; and wherein, determining the compressor inlet pressure and the compressor outlet pressure includes detecting a minimum pressure indication and a maximum pressure indication from the output of the pressure sensor during each compressor cylinder cycle. The system further includes wherein the compressor inlet pressure is based on the minimum pressure indication and the compressor outlet pressure is based on the maximum pressure indication; and wherein the controller is further configured with instructions stored in non-transitory memory, that when executed, cause the controller to: determine a compressor speed based on the output from the pressure sensor; and in response to the compressor speed above a threshold speed, disengaging a clutch coupling the compressor with the energy conversion device when a compressor inlet pressure decreases below a first threshold; disengaging the clutch when a compressor outlet pressure increases above second threshold; and indicating a slippage condition of the clutch when a difference between an expected compressor speed and the compressor speed increases above a threshold difference, the expected compressor speed based on a speed of the energy conversion device. The system further includes wherein the compressor speed is directly proportional to a reciprocal of a duration to complete one cylinder cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle air conditioning system, comprising:
   disengaging a compressor clutch in response to a compressor inlet pressure below a first threshold pressure; and
   increasing a condenser fan speed in response to a compressor outlet pressure above a second threshold pressure, wherein both the compressor inlet and outlet pressures are estimated from a pressure sensor located within a compression chamber of a compressor by isolating a low pressure component from a high pressure component of a pressure sensor output.

2. The method of claim 1, wherein isolating the low-pressure component from the high-pressure component is performed on a pressure sensor output obtained over a duration, the duration based on a number of compressor cycles.

3. The method of claim 2, wherein the low-pressure component is based on the pressure sensor output indicated during an intake stroke of a piston, and wherein the high-pressure component is based on the pressure sensor output indicated during a discharge stroke of the piston.

4. The method of claim 3, wherein the low-pressure component is further based on the pressure sensor output indicated during a first window during the intake stroke of the piston, the first window occurring when a suction valve of a cylinder including the piston is open and a discharge valve of the cylinder is closed; and wherein the low-pressure component is further based on the pressure sensor output indicated during a second window during the discharge stroke of the piston, the second window occurring when the suction valve is closed and the discharge valve is open.

5. The method of claim 4, wherein estimating the compressor inlet pressure further includes averaging the low-pressure component isolated over the number of compressor cycles; and wherein estimating the compressor outlet pressure further includes averaging the high-pressure component isolated over the number of compressor cycles.

6. The method of claim 1, wherein estimating the compressor inlet pressure further includes detecting a minimum pressure from the isolated low-pressure component during each compressor cycle, and estimating the compressor outlet pressure further includes detecting a maximum pressure from the isolated high-pressure component during each compressor cycle.

7. The method of claim 1, further comprising disengaging the compressor clutch in response to the compressor outlet pressure above a third threshold pressure; and wherein the first threshold pressure is less than the second threshold pressure, and the second threshold pressure is less than the third threshold pressure.

8. The method of claim 1, further comprising estimating a speed of the compressor based on an output of the pressure sensor.

9. The method of claim 8, further comprising determining clutch engagement based on the speed of the compressor above a threshold speed; and indicating a slippage condition of the compressor clutch responsive to a difference between an expected compressor speed and the estimated speed of the compressor greater than a threshold, the expected compressor speed based on a speed of an energy conversion device driving the compressor.

10. A method for a vehicle air conditioning system, comprising:
adjusting an air conditioning control parameter based on an inlet pressure of a refrigerant entering a compressor estimated based on one or more pressure indications of a pressure sensor indicated within a first window of a rotation period of a compressor cycle; and
adjusting a different air conditioning control parameter based on an outlet pressure of the refrigerant exiting the compressor estimated based on one or more pressure indications of the pressure sensor measured within a second window of the rotation period, wherein the pressure sensor is located within a compression chamber of the compressor, wherein estimating the inlet pressure includes determining a lowest pressure during the first window during each compressor cycle for a threshold number of compressor cycles and computing a first average of the lowest pressures, and wherein estimating the outlet pressure includes determining a highest pressure during the second window during each compressor cycle for the threshold number of compressor cycles and computing a second average of the highest pressures.

11. The method of claim 10, wherein estimating the inlet pressure includes averaging one or more pressure indications within the first window.

12. The method of claim 11, wherein estimating the outlet pressure includes averaging one or more pressure indications within the second window.

13. The method of claim 12, wherein the first window occurs during an inlet stroke of a compressor piston between a first crank angle degree and a second crank angle degree, and wherein the second window occurs during a discharge stroke of the compressor piston between a third crank angle degree and a fourth crank angle degree.

14. The method of claim 10, wherein adjusting the air conditioning control parameter includes reducing a current supplied to an electromagnetic compressor clutch to disengage the compressor clutch in response to the inlet pressure below a first threshold pressure; and wherein adjusting the different air conditioning control parameter includes increasing a condenser fan speed in response to the outlet pressure above a second threshold pressure, the second threshold pressure greater than the first threshold pressure.

15. An air conditioning system of a vehicle, comprising:
an energy conversion device;
an air conditioner compressor including a cylinder, the cylinder including a compression chamber, a piston, a suction valve, and a discharge valve;
a pressure sensor located within the compression chamber of the cylinder; and
a controller configured with instructions stored in non-transitory memory that, when executed, cause the controller to:
disengage a compressor clutch in response to a compressor inlet pressure below a first threshold pressure; and
increase a condenser fan speed in response to a compressor outlet pressure above a second threshold pressure, wherein both the compressor inlet and outlet pressures are estimated from the pressure sensor by isolating a low pressure component from a high pressure component of a pressure sensor output.

* * * * *